United States Patent [19]

Smith

[11] 4,074,703
[45] Feb. 21, 1978

[54] ACCUMULATOR DRAIN
[75] Inventor: Duane R. Smith, Oswego, Ill.
[73] Assignee: Caterpillar Tractor Co., Peoria, Ill.
[21] Appl. No.: 720,860
[22] Filed: Sept. 7, 1976
[51] Int. Cl.² .......................................... F16K 51/00
[52] U.S. Cl. ............................... 137/798; 251/144;
251/148; 285/14; 285/356; 285/DIG. 25
[58] Field of Search ............... 60/413, 469, 477, 478;
137/588, 798; 285/13, 14, 356, DIG. 25;
91/432; 251/144, 148, 149.4, 149.8

[56] References Cited
U.S. PATENT DOCUMENTS

| 1,580,694 | 4/1926 | Smith | 285/DIG. 25 |
| 1,921,709 | 8/1933 | Stecher | 285/356 X |
| 1,951,460 | 3/1934 | Williams | 285/356 X |
| 2,631,049 | 3/1953 | McGillis | 285/DIG. 25 |
| 2,775,471 | 12/1956 | Douglass | 285/356 X |
| 2,909,897 | 10/1959 | Stockett | 60/469 X |
| 3,521,910 | 7/1970 | Callahan | 285/14 |
| 3,530,668 | 9/1970 | Siebers | 60/469 X |
| 3,877,732 | 4/1975 | Mohaupt | 285/14 X |

FOREIGN PATENT DOCUMENTS 1,373,072 8/1964 France ............................ 285/14

Primary Examiner—Robert G. Nilson
Attorney, Agent, or Firm—Phillips, Moore, Weissenberger, Lempio & Majestic

[57] ABSTRACT

The hydraulic control system including an accumulator includes a safety connecting means for connecting the accumulator to the system so that partial disengagement of the connecting means automatically vents the accumulator to the sump of the hydraulic system.

8 Claims, 3 Drawing Figures

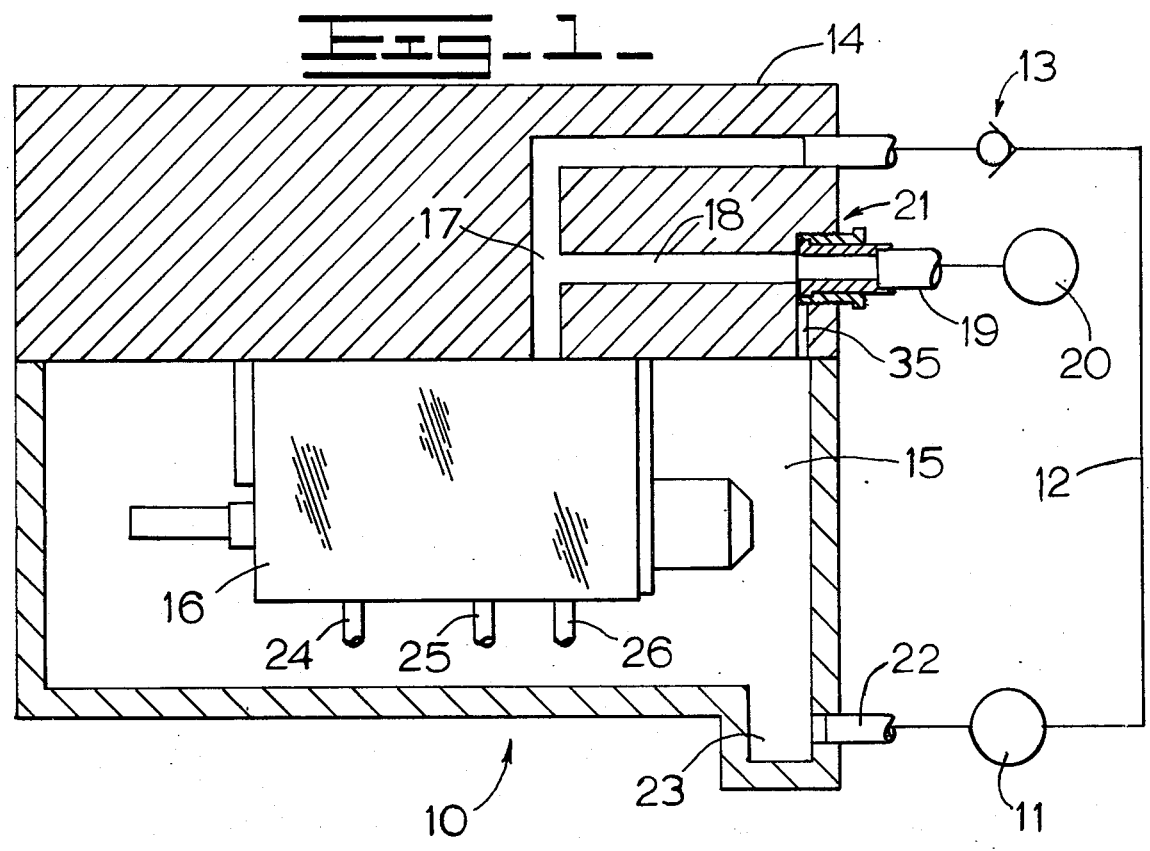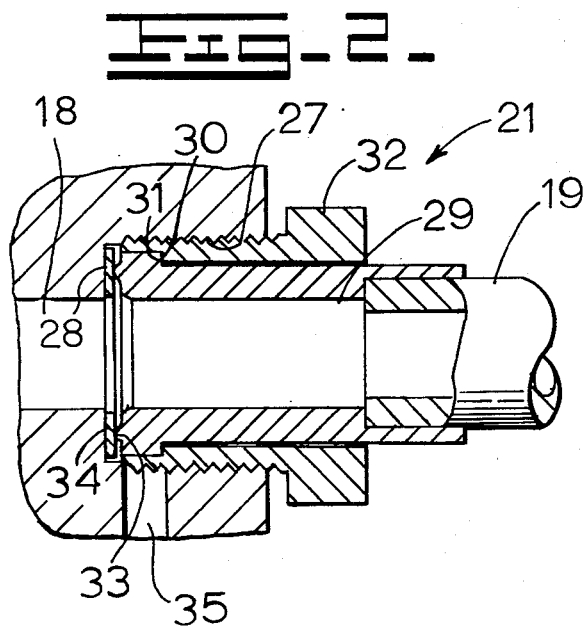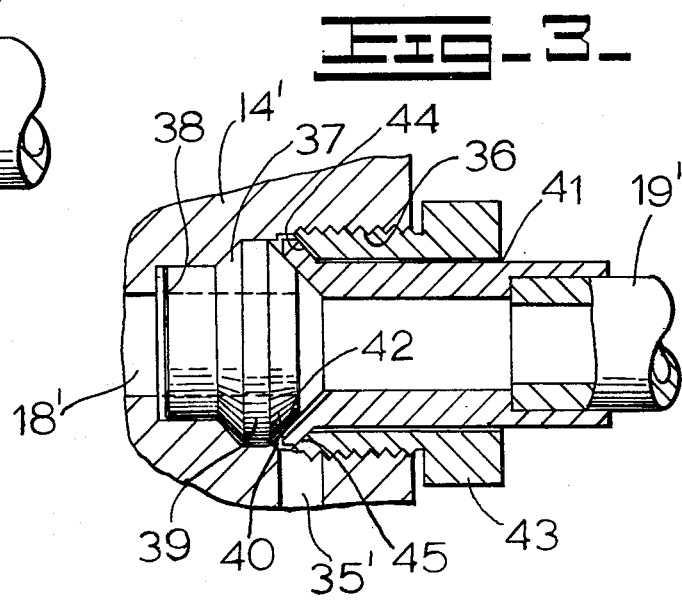

4,074,703

ACCUMULATOR DRAIN

BACKGROUND OF THE INVENTION

The present invention relates generally to hydraulic systems and pertains particularly to a safety connector particularly for accumulators in hydraulic systems.

Many hydraulic systems may utilize accumulators for accumlating and maintaining a supply of pressurized fluid for insuring a supply of pressurized fluid for certain functions within the system. Such accumulators may be employed in intermittently operated hydraulic systems or may be employed as a backup system for a normal hydraulic system. Such accumulators are also frequently employed as a safety means in hydraulic systems should the prime mover driving the system fail so that brakes, clutches and the like can be either set or released and loads which are suspended may be lowered for safety reasons.

Such hydraulic systems occasionally need maintenance or repair of a nature which requires the removal of one or more components from the system. Under such conditions it is desirable that pressure be bled from the system to reduce waste of fluid, the danger of fluid leaking or being sprayed onto engine exhaust manifold or the like and the resultant danger of fire. Such systems are frequently such as to maintain fluid pressure within the accumulator until the accumulator is deliberately bled by an operator or maintenance crew. It is desirable, however, that automatic means be available for bleeding the accumulator in case this is overlooked by the operator or maintenance crew. Failure to bleed the system can result in conduits, hoses and the like being propelled at high velocity through the air by means of the high pressure fluid when these components are disconnected from the system.

Also, it would be advantageous to have automatic bleed means available to vent and drain any hydraulic line, regardless of pressure, prior to complete disconnection to prevent spillage, loss of fluid and hazardous conditions caused by fluid on the floor upon which a serviceman could slip.

SUMMARY AND OBJECTS OF THE INVENTION

It is a primary object of the present invention to overcome the above problems of the prior art.

Another object of the present invention is to provide means for automatically bleeding pressurized fluid from a hydraulic system when disconnecting of the source of the fluid is initiated.

In accordance with the primary aspect of the present invention, a coupling for coupling the conduits between an accumulator and a hydraulic system includes vent means for automatically venting the accumulator once the process of uncoupling is begun or to vent and drain any hydraulic conduit regardless of the pressure conditions within the conduit.

BRIEF DESCRIPTION OF THE DRAWINGS

The above and other objects and advantages of the present invention will become apparent from the following description when read in conjunction with the drawings wherein:

FIG. 1 is a schematic layout of a hydraulic system embodying the present invention;

FIG. 2 is a detailed view in section of a preferred embodiment of the invention; and, FIG. 3 is a detailed view in section of an alternate embodiment of the invention.

DETAILED DESCRIPTION OF THE PREFERRED EMBODIMENT

Turning now to FIG. 1 of the drawing there is illustrated a hydraulic system indicated generally by the numeral 10 comprising a pump 11 supplying pressurized fluid by way of a conduit 12 including a check valve 13 to a control system including a housing 14. The housing 14 defines a chamber 15 in which a valve assembly 16 is mounted for controlling one or more motors, brakes and clutches or the like for a system. The valve 16 is supplied with fluid by way of an inlet conduit or passageway 17 which is in communication with the supply conduit 12. A branch passage 18 is connected by way of detachable conduit means 19 with an accumulator 20. The pump 11 and the accumulator 20 may both be generally referred to as sources of pressurized fluid. The detachable conduit 19 is connected to by way of a port and by means of a safety connecting means indicated generally at 21. The safety connecting means may be utilized between any source of pressurized fluid and the system or components within the system, and is not intended to be utilized solely between an accumulator, as illustrated. The pump 11 draws fluid by way of a conduit 22 from a sump 23 within the housing 14.

The valve assembly 16 can include one or more valves and is operative to communicate by means of a plurality of control lines 24, 25 and 26 for controlling one or more motors, brakes or the like.

Turning now to FIG. 2 there is illustrated in detail the construction of the safety connector assembly 21. The connector includes an enlarged bore coaxially with passage 18 defining a port 27 having internal threads formed therein. A shoulder 28 is formed at the juncture of the enlarged bore 27 and the passage 18.

A fitting 29 is connected to the end of hose or conduit 19 and defines a shoulder 30 which is engaged by a shoulder 31 of a threaded collar 32. The threaded collar 32 engages the abutting shoulder 31 of the fitting 29 and includes external threads cooperatively engaging the threads of the bore 27 for securing the fitting 29 within the bore 27. The fitting 29 includes an annular seal lip or ring 33 which engages an annular disc-like seal 34 against shoulder 28. A vent passage 35 communicates with the bore 27 outward from the seal 34 and the seal face 33.

It will be appreciated that in the position as shown in FIG. 2 the fluid communicates by way of conduit 19 with passageway 17 as long as the members 33 and 34 are in engagement and effective. However, once the seal is broken between the member 29 and the seal faces 33, and 34 by partial disengagement of the connecting means fluid within the conduit 19 can immediately begin communicating with the vent passage 35 with communicates with the interior 15 of housing 14 and the sump 23. Thus, the accumulator 20 will be vented automatically upon partial disengagement or the beginning of removal of the fitting or connecting means 21.

Turning now to the embodiment of FIG. 3 an alternate embodiment is illustrated wherein equivalent or identical elements as in the previous embodiment are identified by the same numeral primed. In this embodiment, the conduit 19' is connected for supplying high pressure fluid from an accumulator (not shown) with a passage 18' in a housing 14' having a vent passage 35'. In this embodiment a bore 36 concentric with passage 18' includes a tapered shoulder 37 and a radial shoulder 38 formed between the bore 36 and the passage 18'. A seal member 39 fits within the end of the bore 36 at the juncture thereof with passage 18 and includes a substantially conical shaped seal face 40. A fixture 41 connected to the end of conduit 19 includes a seal face 42 engaging conical seal face 40 of the seal member 39. This fixture 41 is biased into place within the bore 36 by means of threaded collar 43 including external threads thereon threadably engaging internal threads within bore 36 and including a substantially conical forward shoulder 44 engaging an abutting shoulder 45 on the fixture member or fitting member 41.

As in the previous embodiment it will be appreciated that when the threaded member 43 is backed off from its position within bore 36 such that the seal faces 40 and 42 disengage and separate, then fluid within conduit 19 will flow outward through vent passage 35' into the sump of the system.

With this arrangement the accumulator of the system will be automatically vented as soon as an operator or other person begins disconnecting the connection thereof to the remainder of the system.

While the present invention has been described and illustrated by means of specific embodiments, it is to be understood that numerous changes and modifications may be made therein without departing from the spirit and scope of the invention as defined in the appended claims.

What is claimed is:

1. In a hydraulic system having fluid control means, said fluid control means having a sump in fluid communication therewith, a source of high pressure fluid, and disconnectable conduit means communicating said source with said control means, the improvement comprising:
    safety connecting means for connecting said conduit between said source and said control means, said connecting means including vent means for automatically venting said source to the sump upon partial disengagement of said connecting means.

2. The system of claim 1 wherein:
    said safety connecting means includes a bore defining an outlet port communicating with a passage in communication with said control means,
    an annular member engageable with said bore for connecting one end of said conduit to said port for establishing communication between said conduit and said passage; and,
    a vent passage communicating with said bore between the ends thereof so that partial removal of said annular member from said bore communicates said conduit and said bore with said vent passage.

3. The hydraulic system of claim 1 wherein said source of pressurized fluid includes an accumulator.

4. The hydraulic system of claim 3 wherein:
    said safety connecting means includes a bore defining an outlet port communicating with a passage in communication with said control means,
    an annular member engageable with said bore for connecting one end of said conduit to said port for establishing communication between said conduit and said passage; and,
    a vent passage communicating with said bore between the ends thereof so that partial removal of said annular member from said bore communicates said conduit and said bore with said vent passage.

5. The hydraulic system of drain (4) wherein said bore includes internal thread means extending therealong and an annular shoulder at one end thereof:
    said bore includes a shoulder;
    said annular member includes external thread means extending therealong for engagement with said internal thread means; and
    said annular member includes seal means at a forward end thereof for engaging said shoulder for sealing said connecting means.

6. The hydraulic system of claim 5 wherein:
    said vent passage communicates with said bore closely adjacent to said shoulder so that disengagement of said seal means from said shoulder immediately vents said source via said connecting means and said vent passage.

7. The hydraulic system of claim 5 further including an annular disc-like seal and wherein said seal means includes an annular seal lip, said annular disc-like seal being retained between said shoulder and said annular seal lip.

8. The hydraulic system of claim 5 further including an annular seal having a substantially conical shaped seal face, and wherein said seal means includes a beveled annular seal face, which beveled annular seal face accommodates said conical shaped seal face, said annular seal being retained between said shoulder and said beveled annular seal face of said annular member.

* * * * *